United States Patent
Han et al.

(10) Patent No.: US 12,434,532 B2
(45) Date of Patent: Oct. 7, 2025

(54) AIR CONDITIONER AND AN AIR CONDITIONING SYSTEM HAVING AN INTEGRATED HEAT EXCHANGER

(71) Applicants: HYUNDAI MOTOR COMPANY, Seoul (KR); KIA CORPORATION, Seoul (KR); Hanon Systems, Daejeon (KR)

(72) Inventors: Kwang Ok Han, Seoul (KR); Gee Young Shin, Suwon-si (KR); Su Yeon Kang, Seoul (KR); Dong Ho Kwon, Yongin-si (KR); Myung Hoe Kim, Seoul (KR); Dae Hee Lee, Incheon (KR); In Jae Kang, Daejeon (KR); Tae Young Park, Daejeon (KR); Jae Chun Ryu, Daejeon (KR)

(73) Assignees: HYUNDAI MOTOR COMPANY, Seoul (KR); KIA CORPORATION, Seoul (KR); Hanon Systems, Daejeon (KR)

( * ) Notice: Subject to any disclaimer, the term of this patent is extended or adjusted under 35 U.S.C. 154(b) by 201 days.

(21) Appl. No.: 18/215,691

(22) Filed: Jun. 28, 2023

(65) Prior Publication Data
US 2023/0415538 A1    Dec. 28, 2023

Related U.S. Application Data

(63) Continuation-in-part of application No. 17/990,048, filed on Nov. 18, 2022, now Pat. No. 12,247,749.

(30) Foreign Application Priority Data

Jun. 23, 2022 (KR) .................. 10-2022-0077054
Nov. 3, 2022 (KR) .................. 10-2022-0145268

(51) Int. Cl.
    *B60H 3/00*     (2006.01)
    *B60H 1/00*     (2006.01)
    *B60H 1/22*     (2006.01)

(52) U.S. Cl.
    CPC .................. B60H 1/00028 (2013.01); *B60H 2001/00121* (2013.01); *B60H 2001/2271* (2013.01); *B60H 2001/2278* (2013.01)

(58) Field of Classification Search
    CPC ...... B60H 1/00028; B60H 2001/00121; B60H 2001/2271; B60H 2001/2278
    (Continued)

(56) References Cited

U.S. PATENT DOCUMENTS 12,247,749 B2 * 3/2025 Han .................. F25B 41/20
2018/0072131 A1 3/2018 Lee et al.
(Continued)

FOREIGN PATENT DOCUMENTS

DE    102013109666 A1    3/2015
JP    2003042597 A       2/2003
(Continued)

OTHER PUBLICATIONS

1 Office Action mailed Aug. 9, 2024 cited in corresponding U.S. Appl. No. 17/990,048; 6 pp.

*Primary Examiner* — Davis D Hwu
(74) *Attorney, Agent, or Firm* — Lempia Summerfield Katz LLC

(57) ABSTRACT

Proposed are an air conditioner having an integrated heat exchanger and an air conditioning system using the integrated heat exchanger. The integrated heat exchanger enables heat exchange between cooling water and conditioning-air, and generates heating air or cooling air such that cooling/heating efficiency is improved. Further, since the temperature of the cooling water circulating in the integrated (Continued)

heat exchanger is adjusted, there is no temperature adjustment door for adjusting the temperature of conditioning-air, so the number of parts is reduced. Further, since the integrated heat exchanger is applied, components are optimally arranged and the entire package is reduced in size.

15 Claims, 13 Drawing Sheets

(58) Field of Classification Search
USPC .......................................................... 165/42
See application file for complete search history.

(56) References Cited

U.S. PATENT DOCUMENTS

| | | |
|---|---|---|
| 2018/0162192 A1 | 6/2018 | Lee et al. |
| 2019/0351730 A1 | 11/2019 | Mullett et al. |

FOREIGN PATENT DOCUMENTS

| | | | |
|---|---|---|---|
| JP | 2006082780 A | 3/2006 | |
| KR | 20080076224 A | 8/2008 | |
| KR | 20080092527 A | 10/2008 | |
| KR | 20160133729 A | 11/2016 | |

\* cited by examiner

AIR CONDITIONER AND AN AIR CONDITIONING SYSTEM HAVING AN INTEGRATED HEAT EXCHANGER

CROSS REFERENCE TO RELATED APPLICATIONS

This application is a continuation-in-part application of non-provisional U.S. patent application Ser. No. 17/990,048, filed on Nov. 18, 2022, and claims priority to Korean Patent Application Nos. 10-2022-0077054, filed Jun. 23, 2022, and 10-2022-0145268, filed Nov. 3, 2022, the entire contents of each of which are incorporated herein by reference.

FIELD

The present disclosure relates to an air conditioner having an integrated heat exchanger to improve cooling/heating efficiency, and an air conditioning system using the integrated heat exchanger.

BACKGROUND

The statements in this section merely provide background information related to the present disclosure and may not constitute prior art.

Recently, implementation of an eco-friendly technology and solutions for problems such as energy exhaustion are rising as social issues associated with an electric vehicle. An electric vehicle is driven by a motor that is supplied with electricity from a battery and outputs power. Accordingly, an electric vehicle has advantages of not discharging carbon dioxide, generating a little noise, and having higher energy efficiency of a motor than the energy efficiency of an engine, so it has been spotlighted as an eco-friendly vehicle.

The core technology for achieving such an electric vehicle is the technology related to a battery module, and recently, studies for reducing the weight and size of a battery and decreasing the charge time have been actively conducted. A battery module cannot maintain optimal performance and a long lifespan unless it is used in an optimal temperature environment. However, we have discovered that it is substantially difficult to use a battery module in an optimal temperature environment due to heat that is generated in operation and a change of external temperature.

Further, an electric vehicle has no waste heat source that is generated during combustion in a conventional engine such as an internal combustion engine, so the interior of the electric vehicle is heated by an electric heating device in wintertime. Further, warming-up is required to improve the battery charge/discharge performance in an intense cold period, so a separate cooling water heating-type electric heater is used. In other words, a technology of operating a heating/cooling system for controlling the temperature of a battery module separately from a heating/cooling system for interior air conditioning of a vehicle in order to maintain an optimal temperature environment for the battery module is used.

In this case, a heat pump technology for minimizing consumption of heating energy is applied to the air conditioning system for interior air conditioning of a vehicle to increase the mileage, whereby energy consumption is minimized. An air conditioning system has a temperature adjustment door for selectively adjusting provision of cooling air and heating air and components thereof are spaced apart from each other, including an evaporator and a heater, so the entire size increases. Further, when air conditioning is performed through only circulation of a refrigerant, the volume of the components for circulating the refrigerant increases, so the entire package of the air conditioning system increases in size.

SUMMARY

The present disclosure has been made in an effort to solve the problems described above and provides an air conditioner having an integrated heat exchanger that improves cooling/heating efficiency, using fewer doors for adjusting the temperature of conditioning air for each mode, thus having a compact overall package because the integrated heat exchanger is applied and cooling water is used. The present disclosure also provides an air conditioning system using such an integrated heat exchanger.

In one embodiment of the present disclosure, an air conditioner having an integrated heat exchanger includes: an indoor heat exchanger disposed in an air conditioning housing and configured to generate heating air or cooling air by selectively passing cooling water for heating and cooling water for cooling; and a heater spaced apart from the indoor heat exchanger in the air conditioning housing and configured to selectively discharge heat. In particular, a bleed path is formed around the heater, and a door unit is installed in the air conditioning housing to adjust opening and closing of the bleed path.

In one embodiment, the indoor heat exchanger and the heater may be arranged in such a way that their upper portions are close to each other and lower portions are far from each other.

In one embodiment, the bleed path may be formed over the heater and a bypass path may be formed under the heater in the air conditioning housing.

In one embodiment, the bleed path may pass air at a flow rate of 25% or less of the air that has passed through the heater.

The air conditioning housing may have an air inlet and several air outlets and the several air outlets include at least a defrosting vent hole and one or more front vent holes; and the door unit may include a first door configured to adjust opening and closing of the bleed path and a second door configured to adjust opening and closing of the front vent hole.

The air conditioning housing may have a third door configured to adjust opening and closing of the defrosting vent hole.

The first door and the second door may be installed at the air conditioning housing to be able to rotate on rotation shafts, respectively, and may have moving pins at ends, respectively. The door unit further may include a cam having a plurality of guide slits, in which the moving pins of the doors are inserted, and thus the cam is configured to change rotation positions of the first and second doors through the moving pins moving along the guide slits, respectively.

The guide slits of the cam may extend in a rotation direction while bending inward and outward and may have different shapes, so that timing of opening or closing of the bleed path, the defrosting vent hole, the front vent hole may be differently set.

The air conditioning housing may have least one or more rear vent holes at a lower portion and a rear door may be installed at the rear vent hole.

The rear door may include a fourth door configured to allow air that has passed through the heater to selectively flow to the rear vent hole. The rear door may further include a fifth door configured to allow air that has passed through the indoor heat exchanger to selectively flow to the rear vent hole through the bypass path under the heater without passing through the heater.

In another embodiment, the door unit may include an opening/closing door configured to operate up and down in the bleed path to adjust opening and closing of the bleed path and an actuator configured to control a position of the opening/closing door.

In another embodiment of the present disclosure, an air conditioning system having an integrated heat exchanger includes a refrigerant circuit in which a refrigerant circulates and that includes a compressor, a condenser, an expander, and an evaporator. The air conditioning system further includes: a first cooling water circuit in which cooling water circulates to exchange heat with the condenser of the refrigerant circuit for heating; a second cooling water circuit in which cooling water circulate to exchange heat with the evaporator of the refrigerant circuit for cooling; and a valve module to which the first cooling water circuit and the second cooling water circuit are connected and that changes a flow direction of the cooling water for heating or the cooling. The air conditioning system further includes an indoor heat exchanger that is disposed in the air conditioning housing, to which the first cooling water circuit and the second cooling water circuit are connected, and that receives the cooling water for heating or the cooling water for cooling and generates heating air or cooling air. In another embodiment, a heater spaced apart from the indoor heat exchanger and configured to selectively generate heat is disposed in the air conditioning housing, a bleed path is formed around the heater, and a door unit configured to adjust opening and closing of the bleed path is disposed in the air conditioning housing.

The indoor heat exchanger may include a first heat exchanging part connected with the first cooling water circuit and configured to discharge heat through the cooling water for heating and a second heat exchanging part connected with the second cooling water circuit and configured to absorb heat through the cooling water for cooling.

The first cooling water circuit may include a first water pump and the second cooling water circuit may include a second water pump.

The cooling water in the first cooling water circuit and the cooling water in the second cooling water circuit may be selectively shared by a plurality of sharing valves.

According to the air conditioner having an integrated heat exchanger and the air conditioning system using an integrated heat exchanger that are configured in the structures described above, since heating air and cooling air are generated through the integrated heat exchanger that enables heat exchange between cooling water and conditioning-air, cooling/heating efficiency is improved.

Further, since the temperature of the cooling water circulating in the integrated heat exchanger is adjusted, there is no temperature adjustment door for adjusting the temperature of conditioning-air, so the number of parts is reduced.

Further, since an integrated heat exchanger is applied, components are optimally arranged, so the entire package is reduced in size.

BRIEF DESCRIPTION OF THE DRAWINGS

The above and other objectives, features and other advantages of the present disclosure should be more clearly understood from the following detailed description when taken in conjunction with the accompanying drawings, in which.

DETAILED DESCRIPTION

Figure 1:
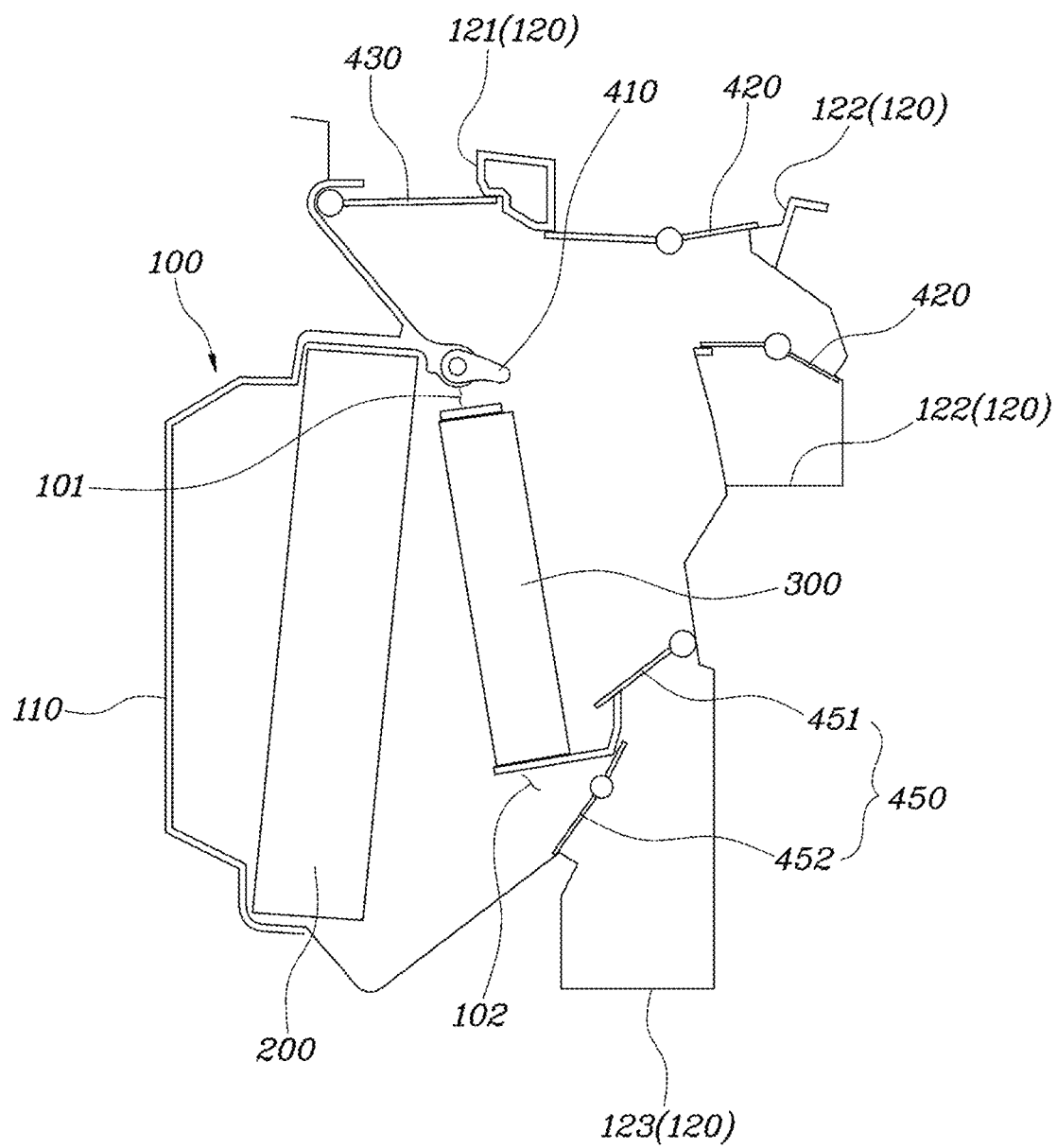
FIG. 1 is a view showing an air conditioner having an integrated heat exchanger according to an embodiment of the present disclosure.

Hereafter, embodiments of the present disclosure are described in detail with reference to the accompanying drawings and the same or similar components are given the same reference numerals regardless of the numbers of figures and are not repeatedly described.

Terms "module" and "unit" that are used for components in the following description are used only for the convenience of description without having discriminate meanings or functions.

In the following description, if it is decided that the detailed description of known technologies related to the present disclosure makes the subject matter of the embodiments described herein unclear, the detailed description is omitted. Further, the accompanying drawings are provided only for easy understanding of embodiments disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, when one element is referred to as being "connected directly to" or "coupled directly to" another element, it may be connected to or coupled to another element without the other element intervening therebetween.

Singular forms are intended to include plural forms unless the context clearly indicates otherwise.

It should be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

When a component, device, element, or the like of the present disclosure is described as having a purpose or performing an operation, function, or the like, the component, device, or element should be considered herein as being "configured to" meet that purpose or to perform that operation or function.

Hereafter, an air conditioner having an integrated heat exchanger and an air conditioning system having an integrated heat exchanger according to embodiments of the present disclosure are described with reference to the accompanying drawings.

Figure 2:
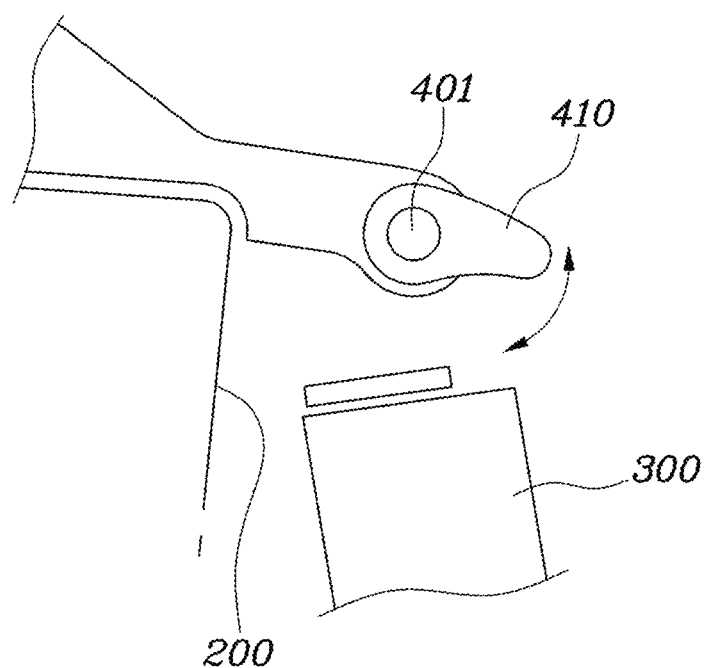
FIG. 2 is a view showing a bleed path and a door unit in the air conditioner having an integrated heat exchanger shown in FIG. 1.

FIG. 1 is a view showing an air conditioner having an integrated heat exchanger according to an embodiment of the present disclosure and FIG. 2 is a view showing a bleed path and a door unit in the air conditioner having an integrated heat exchanger shown in FIG. 1.

Figure 3:
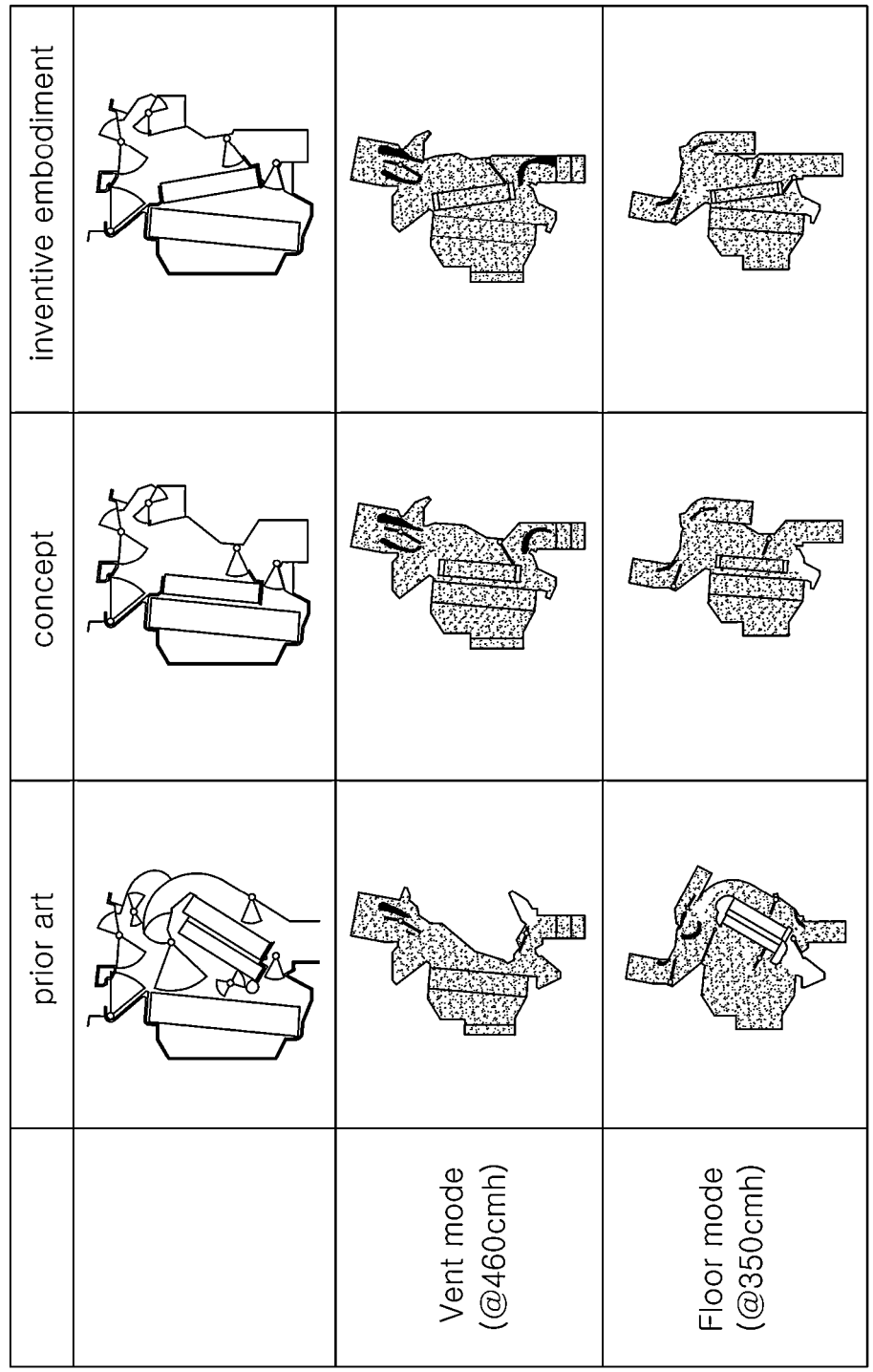
FIG. 3 is a view showing airflow analysis results for explaining the effects of the present disclosure.

FIG. 3 is a view showing airflow analysis results for explaining the effects of the present disclosure.

Figure 4:
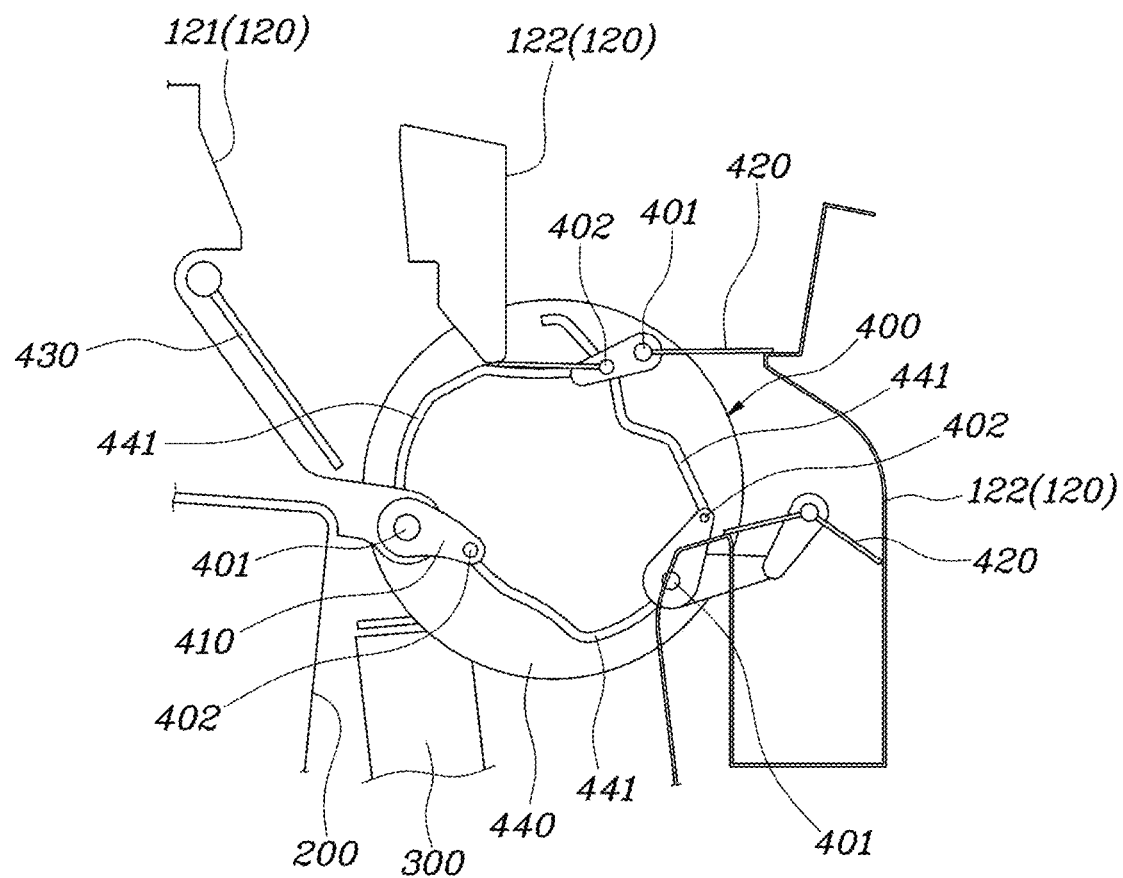
FIG. 4 is a view illustrating doors of the door unit and a cam in the air conditioner having an integrated heat according to an embodiment of the present disclosure.
Figure 5:
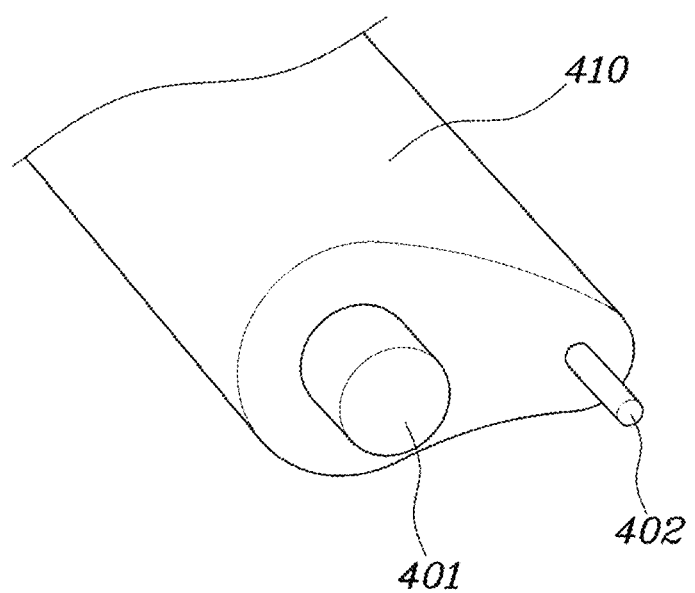
FIG. 5 is a view illustrating a first door of the door unit in an embodiment of the present disclosure.
Figure 6:
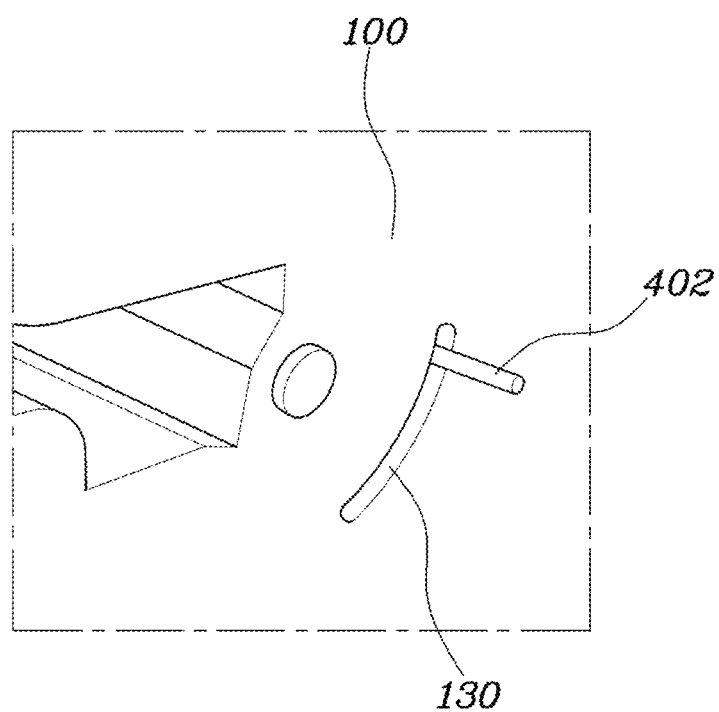
FIG. 6 is a view illustrating a connection structure of an air conditioning housing and the first door of the door unit in an embodiment of the present disclosure.
Figure 7:
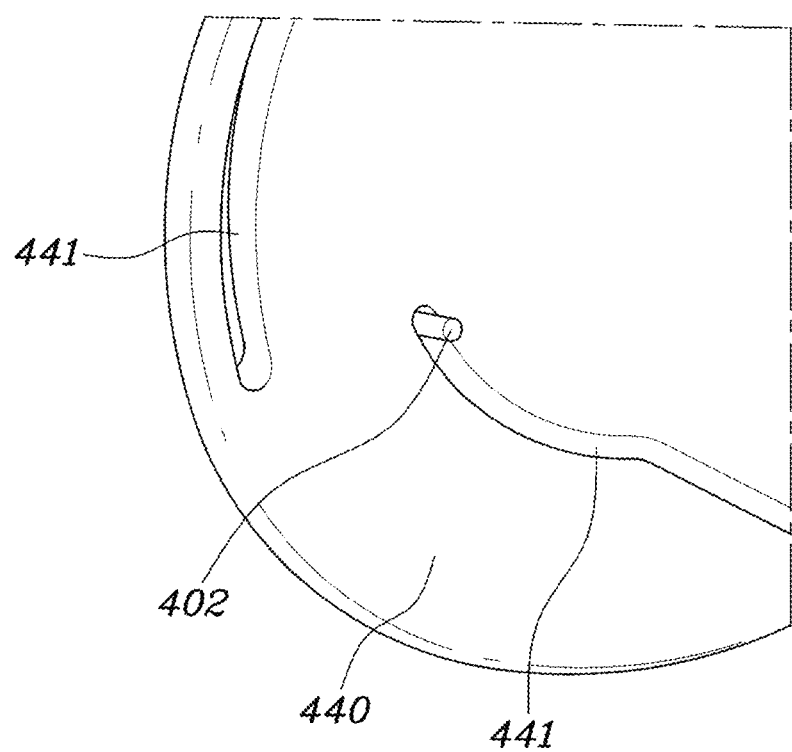
FIG. 7 is a view illustrating a connection structure of the cam and the first door for of the door unit in an embodiment of the present disclosure.

FIG. 4 is a view showing doors of the door unit and a cam in the air conditioner having an integrated heat according to the present disclosure, FIG. 5 is a view showing a first door for explaining the door unit of the present disclosure, FIG. 6 is a view showing a connection structure of an air conditioning housing and the first door for explaining the door unit of the present disclosure, and FIG. 7 is a view showing a connection structure of the cam and the first door for explaining the door unit of the present disclosure.

Figure 8:
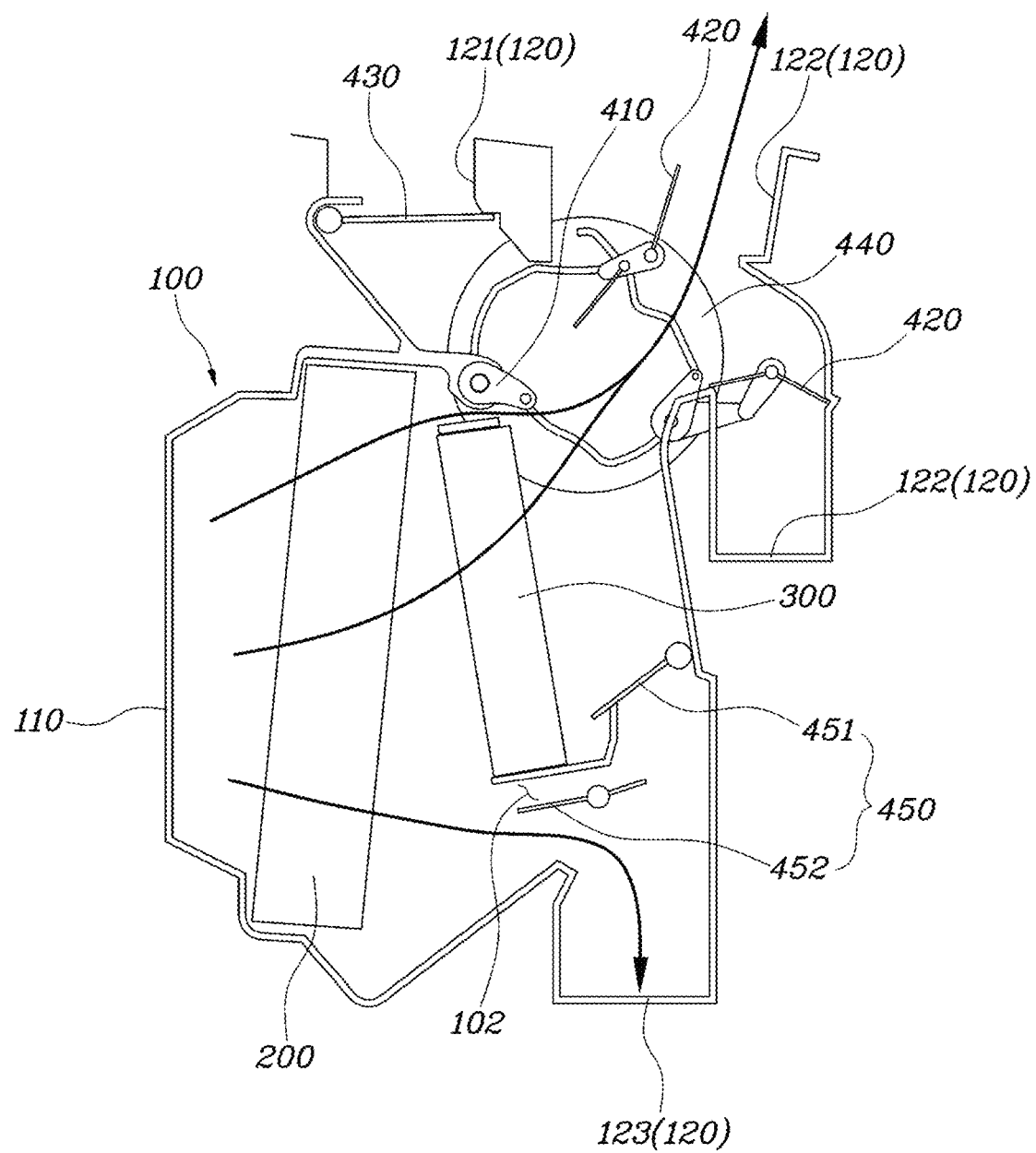
FIG. 8 is a view illustrating interior cooling by the air conditioner having an integrated heat exchanger in an embodiment of the present disclosure.
Figure 9:
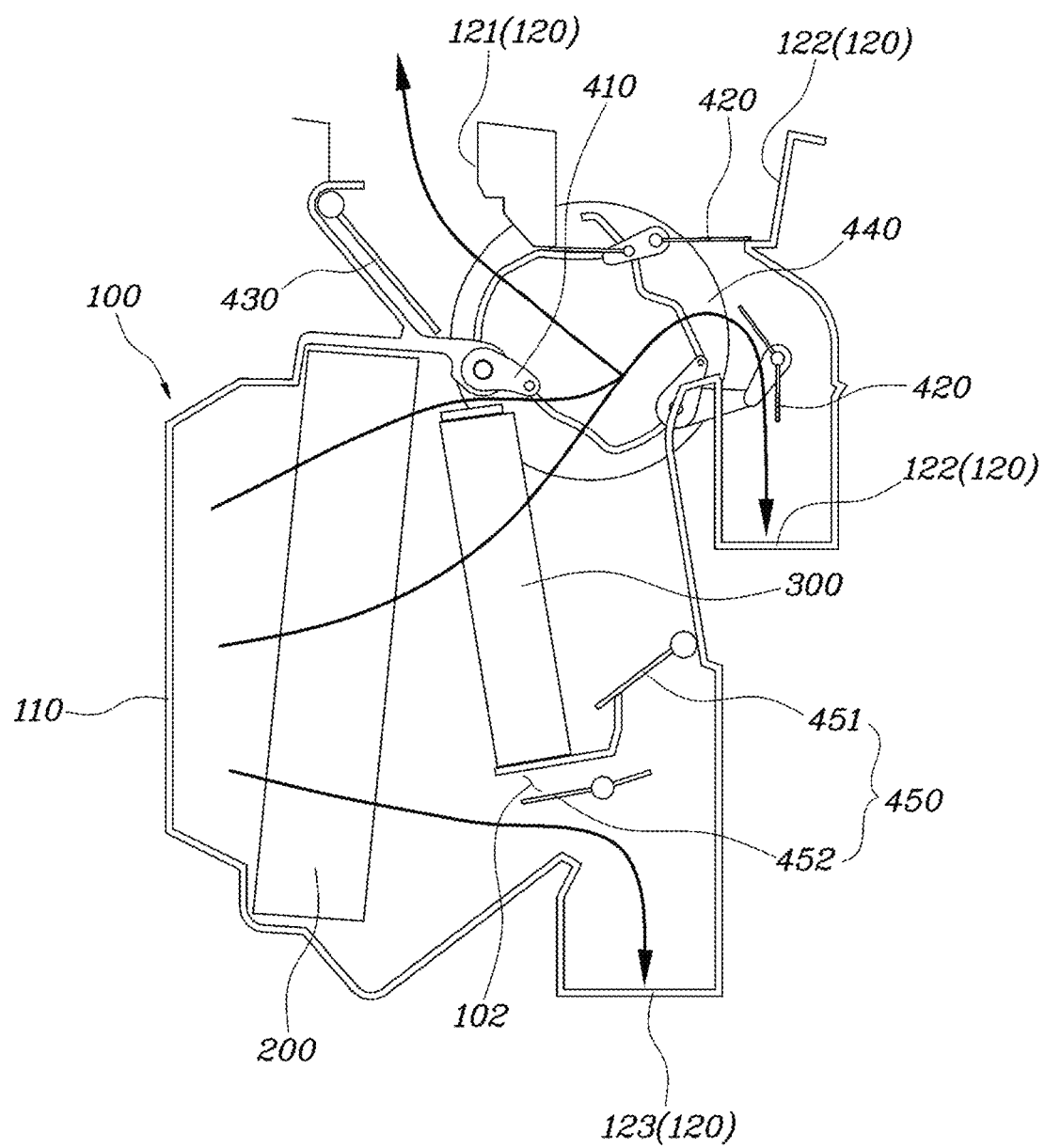
FIG. 9 is a view illustrating interior cooling by the air conditioner having an integrated heat exchanger in an embodiment of the present disclosure.
Figure 10:
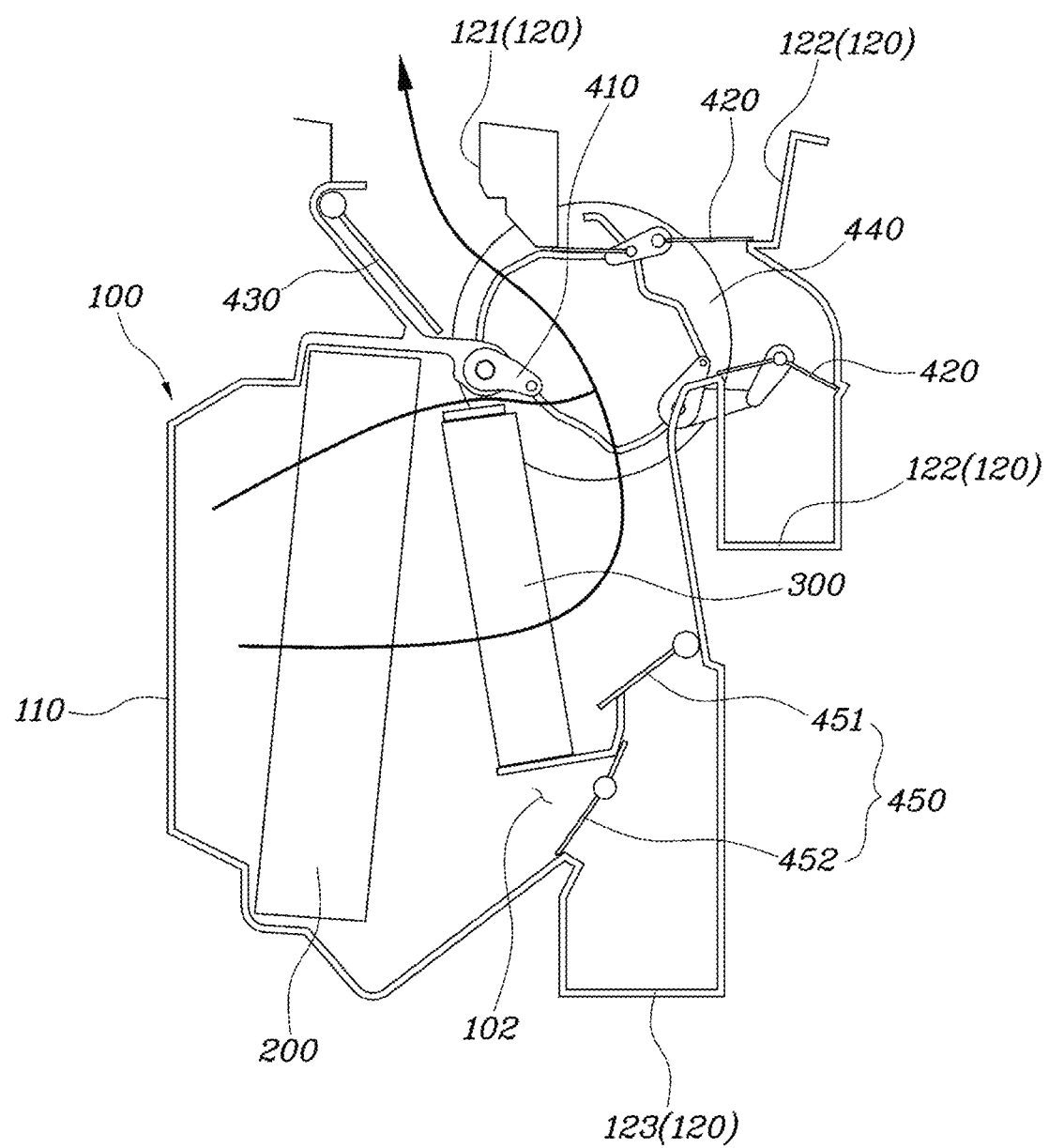
FIG. 10 is a view illustrating defrosting by the air conditioner having an integrated heat exchanger in an embodiment of the present disclosure.
Figure 11:
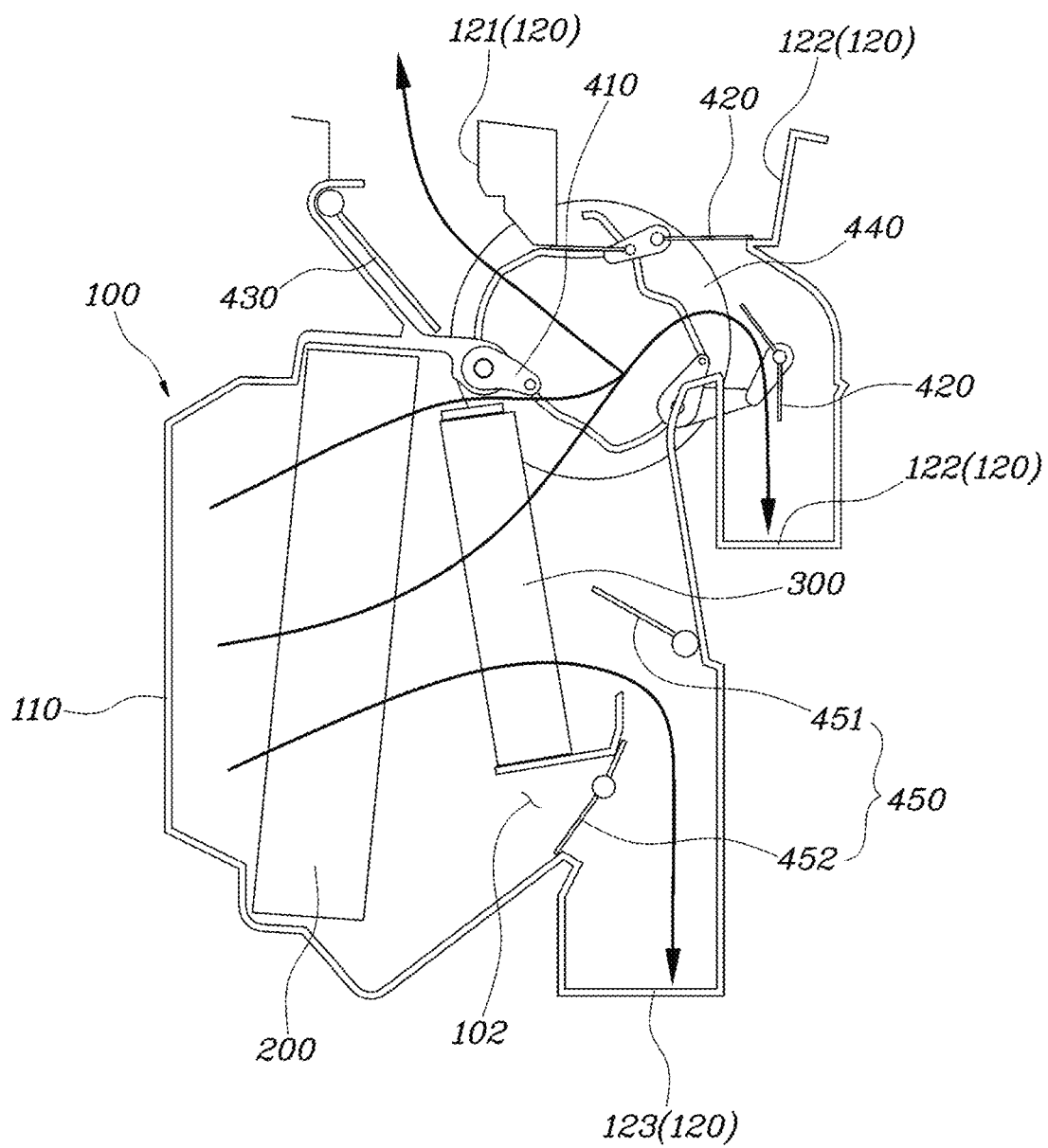
FIG. 11 is a view illustrating a bi-level by the air conditioner having an integrated heat exchanger in an embodiment of the present disclosure.

FIG. 8 is a view illustrating interior cooling by the air conditioner having an integrated heat exchanger of the present disclosure, FIG. 9 is a view illustrating interior cooling by the air conditioner having an integrated heat exchanger of the present disclosure, FIG. 10 is a view illustrating defrosting by the air conditioner having an integrated heat exchanger of the present disclosure, and FIG. 11 is a view illustrating a bi-level by the air conditioner having an integrated heat exchanger of the present disclosure.

Figure 12:
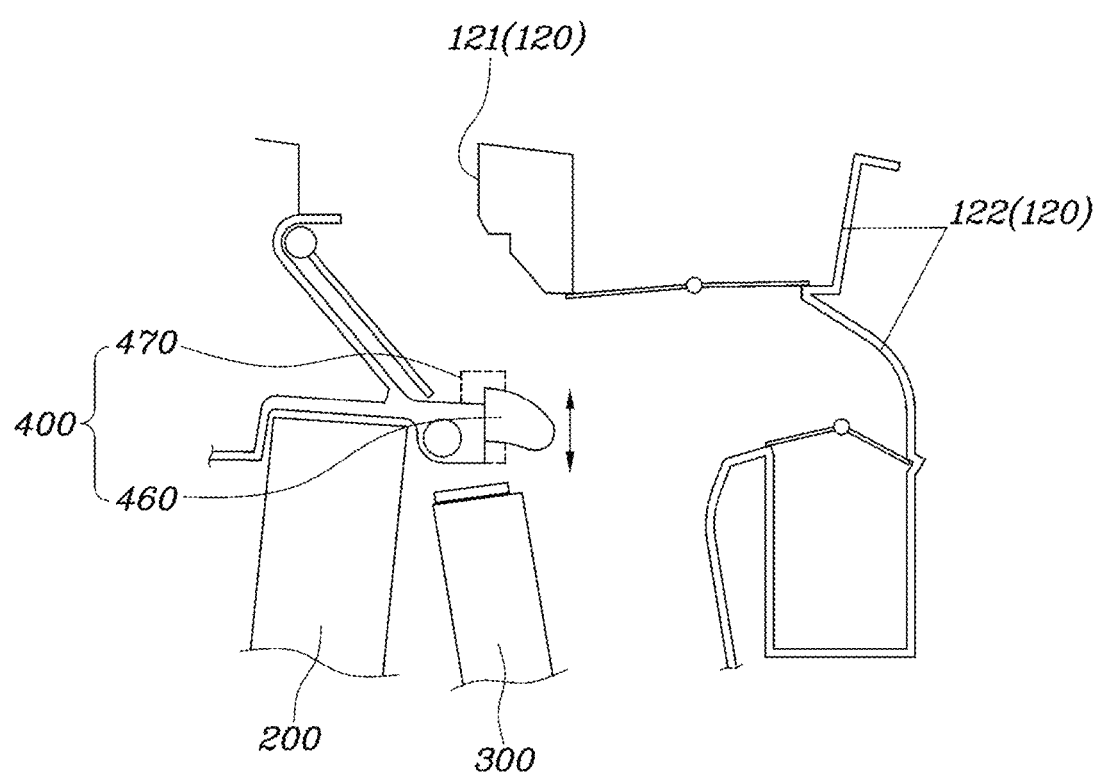
FIG. 12 is a view showing an air conditioner having an integrated heat exchanger according to another embodiment of the present disclosure.

FIG. 12 is a view showing an air conditioner having an integrated heat exchanger according to another embodiment of the present disclosure.

Figure 13:
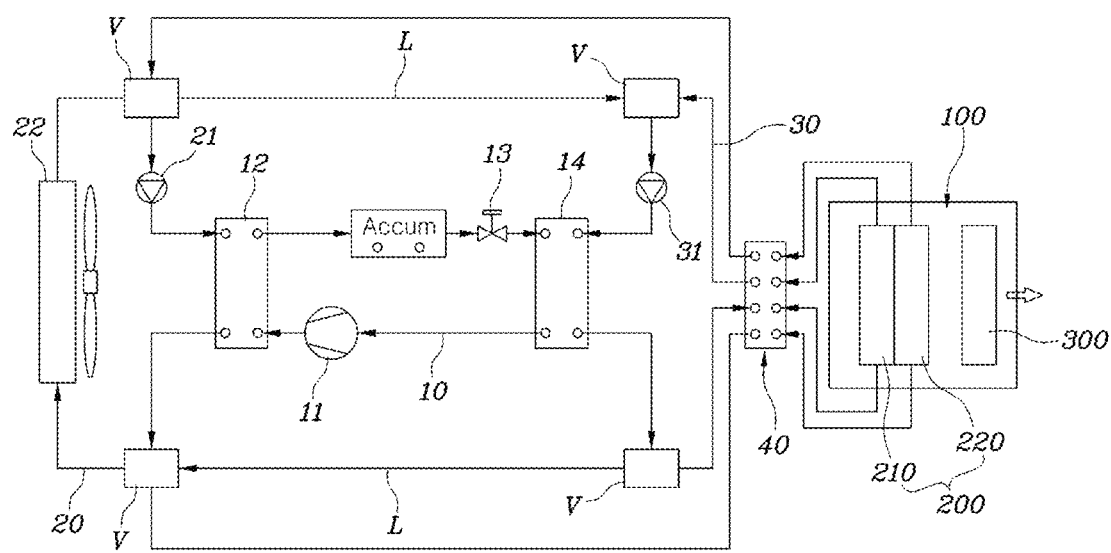
FIG. 13 is a circuit diagram of an air conditioning system using an integrated heat exchanger according to an embodiment of the present disclosure.

Further, FIG. 13 is a circuit diagram of an air conditioning system having the integrated heat exchanger according to the present disclosure.

An air conditioner having an integrated heat exchanger according to the present disclosure, as shown in FIGS. 1 and 2, includes: an indoor heat exchanger 200 that is disposed in an air conditioning housing 100 and generates heating air or cooling air by selectively passing cooling water for heating or cooling water for cooling; and a heater 300 spaced apart from the indoor heat exchanger 200 in the air conditioning housing 100 and selectively discharging heat.

The indoor heat exchanger 200 and the heater 300 are disposed in the air conditioning housing 100 in one embodiment of the present disclosure.

In this configuration, the cooling water for heating and the cooling water for cooling selectively flows through the indoor heat exchanger 200, whereby it is possible to provide conditioning-air according to a required interior temperature through the indoor heat exchanger 200. In other words, the temperature of the cooling water flowing through the indoor heat exchanger 200 can be managed through heat exchange with another heat exchange medium. In an embodiment of the present disclosure, the cooling water and a refrigerant may exchange heat with each other such that the temperature of the cooling water is adjusted. For example, the cooling water flowing through the indoor heat exchanger 200 may be heated by exchanging heat with a high-temperature refrigerant through a condenser 12 and then flow through the indoor heat exchanger 200 as cooling water for heating, or may be cooled by exchanging heat with a low-temperature refrigerant through an evaporator 14 and then flow through the indoor heat exchanger 200 as cooling water for cooling.

Therefore, heating air or cooling air is generated by the cooling water for heating and the cooling water for cooling that selectively flow through one indoor heat exchanger 200, so it is possible to adjust the temperature of conditioning-air without a specific temperature adjustment door.

In one embodiment, the heater 300 is spaced apart from the indoor heat exchanger 200 in the air conditioning housing 100. The heater 300 may be a PTC heater for supplemental heating when only the indoor heat exchanger 200 is insufficient for heating.

In particular, according to the present disclosure, a bleed path 101 is formed around the heater 300 and a door unit 400 that opens or closes the bleed path 101 is installed in the air conditioning housing 100.

Since the bleed path 101 is formed around the heater 300 in the air conditioning housing 100, a portion of air that has passed through the indoor heat exchanger 200 bypasses the heater 300 through the bleed path 101 so that a flow rate of air is secured.

Further, the door unit 400 that opens or closes the bleed path 101 is installed in the air conditioning housing 100, and air flowing through the bleed path 101 can be allowed or blocked and a flow direction of the air can be changed, depending on the opened and closed positions of the door unit 400.

The door unit 400 may have a panel-shaped door to be able to close the bleed path 101 and the door can be fully opened or closed depending on the rotation position of the door. Further, when the door is positioned to open only a portion of the bleed path 101, the door is positioned at an angle in the bleed path 101, so the air passing through the bleed path 101 is guided to the heater 300 by the door, so the air can be mixed with air that has passed through the heater 300.

Therefore, according to the present disclosure, it is possible to improve air conditioning efficiency as optimized for each of air conditioning modes by adjusting the flow rate of the air passing through the bleed path 101 using the door unit 400 in accordance with the indoor air conditioning modes.

The present disclosure having the configuration described above is described in detail. The indoor heat exchanger 200 and the heater 300 each have upper and lower portions. In particular, the upper portions of the indoor heat exchanger 200 and the heater 300 are arranged to be close to each other and the lower portions are arranged to be far from each other, so the indoor heat exchanger 200 and the heater 300 can form an inverse V shape.

Since the indoor heat exchanger 200 and the heater 300 are disposed at an angle in this way, when condensate water is produced in the indoor heat exchanger 200, the condensate water is easily discharged and dispersed and the heater 300 is free from influence by the condensate produced in the indoor heat exchanger 200, whereby stability of high-voltage parts is secured.

Further, resistance against the airflow in the air conditioning housing 100 is minimized by the arrangement of the indoor heat exchanger 200 and the heater 300, so it is possible to secure an air volume.

Accordingly, as seen from the airflow analysis results shown in FIG. 3, it can be seen that flow resistance is reduced in the arrangement structure of the indoor heat exchanger 200 and the heater 300 according to the present disclosure in comparison to the related art and a concept.

Further, as shown in the following Table 1 according to the analysis result, it can be seen that the pressure values in the air conditioning housing 100 according to airflow at outlets decrease just by comparing the concept and the embodiment of the present disclosure.

TABLE 1

| | Mode | Air volume to EVAP [CMH] | Specification examination of integrated heat exchanger [mmAq] | |
|---|---|---|---|---|
| | | | Concept | Embodiment of disclosure |
| Analysis result | Vent | 450 | (+6.1) | (+5.6) |
| | Floor | 350 | (−17.4) | (−18.0) |
| | Def | 350 | (−14.0) | (−14.5) |

This analysis result was obtained in the state in which the same air inflow condition, the same heater 300 condition, and the same outlet duct resistance condition were satisfied.

In an embodiment, the bleed path 101 may be formed to pass air at a flow rate of 25% or less of the air that has passed through the heater 300.

When the bleed path 101 is set to pass air exceeding 25% of the flow rate of the air that has passed through the heater 300, the flow rate of the air passing through the heater 300 in indoor heating decreases, so that the heating performance is deteriorated. Accordingly, the bleed path 101 makes the flow rate of the air passing through the bleed path 101 be set as 25% or less of the flow rate of the air that has passed through the heater 300, so that heating performance is improved and the internal pressure of the air conditioning housing 100 decreases through improvement of airflow.

Meanwhile, as shown in FIG. 1, the bleed path 101 is formed over the heater 300 and a bypass path 102 is formed under the heater 300 in the air conditioning housing 100, so some air that has passed through the indoor heat exchanger 200 flows through the bleed path 101 and the bypass path 102 without passing through the heater 300.

In other words, the air conditioning housing 100 has several vent holes for discharging conditioning-air to various positions in the interior and the vent holes are distributed at the upper portion and the lower end of the air conditioning housing 100. Accordingly, since the bleed path 101 and the bypass path 102 are formed over and under the heater 300, respectively, in the air conditioning housing 100, the flow rate of air flowing to the vent holes is secured.

Further, since the bleed path 101 and the bypass path 102 are formed around the heater 300 in the air conditioning housing 100, flow resistance due to disposition of the heater 300 in the air conditioner is solve. In other words, since some of the air that has passed through the indoor heat exchanger 200 flows through the bleed path 101 and the bypass path 102 without passing through the heater 300 in the air conditioning housing 100, pressure can be reduced and flow can be improved in the air conditioning housing 100.

According to this embodiment of the present disclosure, the air conditioning housing 100 has an air inlet 110 and several air outlets 120, the several air outlets 120 include at least one or more defrosting vent holes 121 and front vent holes 122, and the door unit 400 may include a first door 410 that adjusts opening and closing of the bleed path 101 and a second door 420 that adjusts opening and closing of the front vent hole 122.

A third door 430 that adjusts opening and closing of the defrosting vent hole 121 may be further disposed in the air conditioning housing 100.

The second door 420 may be connected in a link structure, depending on the position of the front vent hole 122, whereby the second door 420 can perform opening and closing by rotating in connection with rotation of the cam 440.

Air flowing in the air conditioning housing 100 through the air inlet 110 flows to an interior space through the air outlets 120. In particular, the air outlets 120 may include the defrosting vent hole 121 and the front vent hole 122 so that conditioning-air is provided to various positions in an interior space, and may further include a rear vent hole 123 to be described below. These vent holes may be added or may diverge so that air flows to various positions in an interior space.

In this configuration, the defrosting vent hole 121 and the front vent hole 122 are disposed at the upper portion in the air conditioning housing 100, so the air that has passed through the indoor heat exchanger 200 and the heater 300 and the air that has passed through the bleed path 101 over the heater 300 flow to the defrosting vent hole 121 and the front vent hole 122 while mixing.

The air flowing in the air conditioning housing 100 in this way can selectively flow to the front vent hole 122, depending on the opening and closing positions of the second door 420, or can selectively flow to the defrosting vent hole 121, depending on the opening and closing positions of the third door 430. Further, air selectively flows through the bleed path 101, depending on the opening and closing position of the first door 410, whereby it is possible to secure optimal flow rates of air in accordance with interior air conditioning modes.

The third door 430 may be included in the door unit 400 or may be individually configured.

The door unit 400 according to an embodiment of the present disclosure is described in detail. As shown in FIGS. 4 to 7, the first door 410 and the second door 420 are installed at the air conditioning housing 100 to be able to rotate on rotation shafts 401, respectively.

The door unit 400 further includes a cam 440 that has a plurality of guide slits 441, in which moving pins 402 of the doors are inserted, and changes the rotation positions of the doors through the moving pins 402 moving along the guide slits 441, respectively, whereby it is possible to adjust the opening and closing positions of the first door 410 and the second door 420 in connection with rotation of the cam 440. The cam 440 can be rotated by a motor disposed in the air conditioning housing 100 and the motor is controlled by a controller.

According to the present disclosure, as described above, the door unit 400 includes the cam 440 and the doors, and the opening and closing of the doors are adjusted in connection with the cam 440.

Because the first door 410 and the second door 420 are disposed at the upper portion of the air conditioning housing 100, the doors can be disposed in the rotation range of the cam 440.

The first door 410 and the second door 420 each have the rotation shaft 401, so they are installed in the air conditioning housing 100 to be able to rotate on the rotation shafts 401. The doors each have a moving pin 402 at an end thereof spaced apart from the rotation shaft 401, so the doors are connected to the cam 440 through the moving pins 402. In the present disclosure, the doors may be positioned in the air conditioning housing 100 and the cam 440 may be positioned outside the air conditioning housing 100, and a plurality of through-holes 130 may be formed at the air conditioning housing 100 so that the moving pins 402 of the doors are disposed through the through-holes. The cam 440 is formed to include the ranges of the moving pins 402 of the doors.

Accordingly, the moving pins 402 of the doors are inserted in the guide slits 441 of the cam 440, and when the cam 440 is rotated, the moving pins 402 are moved along the paths of the guide slits 441, whereby the rotation positions of the doors having the moving pins 402 can be adjusted in connection with the movement.

The guide slits 441 of the cam 440 extend in the rotation direction while bending inward and outward and the shapes of the guide slits 441 are different, so the points in time (i.e., timing) of opening or closing of the bleed path 101 and the front vent hole 122 can be differently set.

As can be seen in FIG. 4, the cam 440 has a plurality of guide slits 441 in which the moving pins 402 of the doors are inserted, respectively, and the guide slits 441 bend inward and outward in the rotation direction, so when the cam 440 is rotated, the moving pins 402 are moved through the guide slits 441, whereby the doors can be rotated.

In particular, since the extending shapes of the guide slits 441 of the cam 440 are different, the timing of opening and closing of the first door 410 and the second door 420 can be differently set according to the movement of the moving pins 402 in the guide slits 441 when the cam 440 is rotated. Accordingly, when the cam 440 is rotated, not only the first door 410 and the second door 420 can be set to be simultaneously opened or closed, but also any one or more of the first door 410 and the second door 420 are selectively opened or closed and thus airflow can be optimized in accordance with the air conditioning modes.

For example, according to an embodiment of the present disclosure, in interior cooling, as shown in FIG. 8, cooling water for cooling circulates through the indoor heat exchanger 200 and cooling air is generated in the air conditioning housing 100.

In this case, the door unit 400 opens the first door 410 and the second door 420 through rotation of the cam 440, so air flows through the bleed path 101, whereby airflow is improved. Further, the front vent hole 122 is opened, so the cooling air is provided to an interior.

In interior heating, as shown in FIG. 9, cooling water for heating circulates through the indoor heat exchanger 200 and the heater 300 is operated, so heating air is generated in the air conditioning housing 100.

In this case, the door unit 400 opens the first door 410 and the second door 420 through rotation of the cam 440, so air flows through the bleed path 101, whereby airflow is improved. Further, the front vent hole 122 is opened, so the heating air is provided to an interior.

When a higher heating temperature is required, it is possible to close the first door 410 so that the entire air that has passed through the indoor heat exchanger 200 passes through the heater 300.

In this interior cooling or heating, the third door 430 can be opened of closed, depending on whether air flows to the defrosting side.

Meanwhile, in defrosting, as shown in FIG. 10, the door unit 400 opens only a portion of the first door 410 and closes the second door 420 through rotation of cam 440. Further, the third door 430 is opened.

Accordingly, the air that has passed through the indoor heat exchanger 200 and the heater 300 flows to the defrosting vent hole 121 and a flow rate of air is secured through the bleed path 101 formed over the heater 300, so the flow rate of air required for defrosting can be satisfied. Because the first door 410 is positioned to be only partially opened, the air that has passed through the bleed path 101 is guided downward by the first door 410 and mixed with the air that has passed through the heater 300, so conditioning-air required for defrosting can be smoothly provided.

Meanwhile, in a bi-level for adjusting the temperature of conditioning-air, as shown in FIG. 11, the door unit 400 opens only a portion of the first door 410 and opens the second door 420 through rotation of cam 440. In this case, the third door 430 can be closed or partially opened.

Accordingly, the temperature of air is adjusted through the indoor heat exchanger 200 and the heater 300 and a flow rate of air is secured through the bleed path 101 formed over the heater 300, so the flow rate of air flowing to the front vent hole 122 and the defrosting vent hole 121 can be satisfied. Further, because the first door 410 is positioned to be only partially opened, airflow is guided such that the air that has passed through the bleed path 101 and the air that has passed through the heater 300 are mixed, so it is easy to adjust the temperature of the conditioning-air.

In addition, at least one or more rear vent holes 123 are formed at the lower portion of the air conditioning housing 100 and a rear door 450 may be installed at the rear vent hole 123.

The rear door 450 may include a fourth door 451 that allows the air that has passed through the heater to selectively flow to the rear vent hole 123 and a fifth door 452 that allows the air that has passed through the indoor heat exchanger 200 to selectively flow to the rear vent hole 123 through the bypass path 102 under the heater 300 without passing through the heater 300.

Because the rear vent hole 123 is formed at the lower portion of the air conditioning housing 100, the air that has passed through the indoor heat exchanger 200 and the heater 300 and the air that has passed through the bypass path 102 under the heater flow to the rear vent hole 123 while mixing.

Because the rear door 450 has the fourth door 451 and the fifth door 452, in interior cooling, the cooling air that has passed through the indoor heat exchanger 200 flows to an interior through the fourth door 451 that is open without passing through the heater 300, so a flow rate of air that flows to the rear space of the interior can be secured.

Further, the fourth door 451 is opened and the fifth door 452 is closed in interior heating, whereby the air that has passed through the indoor heat exchanger 200 and the heater 300 can flows to the rear space of the interior.

The fourth door 451 and the fifth door 452 may be individually operated by respectively providing motors, or the same structure as the cam 440 described above can be applied to the fourth and fifth doors and the rotation positions thereof can be adjusted.

Meanwhile, a door unit 400 according to another embodiment of the present disclosure may include an opening/closing door 460 that is operated up and down in the bleed path 101 to adjust opening and closing of the bleed path 101, and an actuator 470 that controls the position of the opening/closing door 460.

As shown in FIG. 12, the door unit 400 may include an opening/closing door 460 and an actuator 470, and the opening/closing door 460 may be installed to straightly move up and down, thereby being able to selectively open and close the bleed path 101. The opening/closing door 460 may be bent downward so that the air that has passed through the bleed path 101 is smoothly mixed with the air that has passed through the heater.

Because the opening/closing door 460 is moved straightly up and down, the operational stability is secured. The actuator 470 that controls the position of the opening/closing door 460 may be a motor or a solenoid and may be configured to operate with another door by applying the structure of the cam 440 described above.

Meanwhile, an air conditioning system using an integrated heat exchanger, as shown in FIG. 13, includes: a refrigerant circuit 10 in which a refrigerant circulates and that includes a compressor 11, a condenser 12, an expander 13, and an evaporator 14; a first cooling water circuit 20 in which cooling water for heating that exchanges heat with the condenser 12 of the refrigerant circuit 10 circulates; a second cooling water circuit 30 in which cooling water for cooling that exchanges heat with the evaporator 14 of the refrigerant circuit 10 circulates; and a valve module 40 to which the first cooling water circuit 20 and the second cooling water circuit 30 are connected and that changes the flow direction of the cooling water for heating or the cooling water for cooling. The air conditioning system further includes an indoor heat exchanger 200 that is disposed in an air conditioning housing 100, to which the first cooling water circuit 20 and the second cooling water circuit 30 are connected, and that receives the cooling water for heating or the cooling water for cooling and generates heating air or cooling air. In an embodiment, a heater 300 that is spaced apart from the indoor heat exchanger 200 and selectively generates heat is disposed in the air conditioning housing 100. In another embodiment, a bleed path 101 is formed around the heater 300, and a door unit 400 that adjusts opening and closing of the bleed path 101 is disposed in the air conditioning housing 100.

In another embodiment, the first cooling water circuit 20 includes a first water pump 21 and an outdoor heat exchanger 22, and the second cooling water circuit 30 includes a second water pump 31. The outdoor heat exchanger 22 may be a radiator.

According to an embodiment of the present disclosure, the compressor 11, the condenser 12, the expander 13, and the evaporator 14 are included in the refrigerant circuit 10, and a refrigerant sequentially circulates through the compressor 11, the condenser 12, the expander 13, and the evaporator 14.

A high-temperature and high-pressure refrigerant compressed through the compressor 11 flows into the condenser 12 in the refrigerant circuit 10, whereby the cooling water circulating in the first cooling water circuit 20 connected to the condenser 12 is cooled by heat from the condenser 12. Accordingly, the first cooling water circuit 20 includes the condenser 12, and cooling water exchanges heat with the refrigerant through the condenser 12 and circulates as cooling water for heating.

Further, in the refrigerant circuit 10, cooling water circulating in the second cooling water circuit 30 connected to the evaporator 14 is cooled by an endothermic action through the evaporator 14. Accordingly, the second cooling water circuit 30 includes the evaporator 14, and cooling water exchanges heat with the refrigerant through the evaporator 14 and circulates as cooling water for cooling.

The cooling water flowing in the first cooling water circuit 20 and the second cooling water circuit 30 exchanges heat through the condenser 12 and the evaporator 14, respectively, and the first cooling water circuit 20 and the second cooling water circuit 30 are connected to the indoor heat exchanger 200 disposed in the air conditioning housing such that cooling water flows to the indoor heat exchanger 200, whereby cooling water exchanges heat with conditioning-air through the indoor heat exchanger 200. The first cooling water circuit 20 includes the first water pump 21, whereby cooling water circulates in the first cooling water circuit 20, and the second cooling water circuit 30 includes the second water pump 31, whereby cooling water circulates in the second cooling water circuit 30.

In particular, because the valve module 40 is connected to the cooling water circuit 20 and the second cooling water circuit 30, cooling water for heating or cooling water for cooling flowing to the indoor heat exchanger 200 is selectively passed or blocked, whereby whether to generate heating air or cooling air through the indoor heat exchanger 200 can be determined. The valve module 40, which is a multi-way valve, may be configured such that several 4-way valves are modularized.

Therefore, according to the present disclosure, the temperature of the cooling water circulating through the first cooling water circuit 20 and the second cooling water circuit 30 is adjusted by circulation of the refrigerant in the refrigerant circuit 10. Further, since the cooling water flowing through the first cooling water circuit 20 and the second cooling water circuit 30 selectively flows to the indoor heat exchanger 200 by the valve module 40, conditioning-air according to a required interior temperature can be provided through the indoor heat exchanger 200. Further, because the temperature of cooling water is adjusted by circulation of a refrigerant and heating air or cooling air is generated in the air conditioning housing 100 using the cooling water, the configuration of the refrigerant circuit 10 is simplified and the package for refrigerant circulation is reduced. Further, the cooling water at different temperature circulating through the first cooling water circuit 20 and the second cooling water circuit 30 flows into one indoor heat exchanger 200 and adjusts the temperature of conditioning-air, so it is possible to adjust the temperature of the conditioning-air without a temperature adjustment door by selectively passing cooling water through the valve module.

Accordingly, cooling water is heated by the condenser 12 while being circulated by operation of the first water pump 21 in the first cooling water circuit 20, and is cooled through the indoor heat exchanger 200, whereby the temperature of the cooling water can be managed. Further, in the second cooling water circuit 30, cooling water can be cooled by the evaporator 14 while being circulated by operation of the second water pump 31.

Further, the cooling water in the first cooling water circuit 20 and the cooling water in the second cooling water circuit 30 may be selectively shared by a plurality of sharing valves V. The sharing valves V may be disposed before and after the condenser 12 in the first cooling water circuit 20 and before and after the evaporator 14 in the second cooling water circuit 30, and the sharing valves V in the first cooling water circuit 20 and the sharing valves V in the second cooling water circuit 30 may be connected to each other through a sharing line L. Accordingly, whether the sharing valves V in the first cooling water circuit 20 and the second cooling water circuit 30 are opened or closed, cooling water can individually circulate in the first cooling water circuit 20 and the second cooling water circuit 30, or the cooling water circulating in the first cooling water circuit 20 and the cooling water circulating in the second cooling water circuit 30 can be shared. Accordingly, it is easy to adjust the temperature of cooling water for satisfying the temperatures required for interior air conditioning and it is possible to efficiently employ the cooling water in accordance with the surrounding situation and the external environment.

Therefore, as for the difference between the related art and the present disclosure, in the related art, a condenser for generating heating air and an evaporator for generating cooling water should be spaced apart from each other in an air conditioning housing and the condenser should be relatively downsized, so it is difficult to secure the quantity of heat for heating air. However, in an embodiment of the present disclosure, since a single indoor heat exchanger is disposed in the air conditioning housing 100, the entire package of the air conditioning housing 100 is reduced and there is temperature adjustment door, so the number and weight of parts are reduced. Further, since the indoor heat exchanger 200 exchanges heat with conditioning-air through the entire area thereof regardless of whether to generate heating air or cooling air, the performance for both of heating and cooling is secured.

Meanwhile, the indoor heat exchanger 200 may include a first heat exchanging part 210 connected with the first cooling water circuit 20 and discharging heat through the cooling water for heating and a second heat exchanging part 220 connected with the second cooling water circuit 30 and absorbing heat through the cooling water for cooling.

In other words, the indoor heat exchanger 200 may have a first heat exchanging part 210 and a second heat exchanging part 220, and the second heat exchanging part 220 through which the cooling water for cooling flows may be disposed, in the airflow direction, ahead of the first heat exchanging part 210 through which the cooling water for heating flows.

The first heat exchanging part 210 and the second heat exchanging part 220 may have the same area and each may have a plurality of tubes, through which cooling water flows, and fins connected to the tubes. In particular, when the first heat exchanging part 210 and the second heat exchanging part 220 are tubes, corrosion resistance can be secured by applying a folded tube and a plurality of fins may have the same fin pitch per decimeter (FPDM), in which the FPDM may be in the range of 108 to 125. The indoor heat exchanger 200 composed of the first heat exchanging part 210 and the second heat exchanging part 220 may be configured such that cooling water flows at the same flow rate, corrosion resistance is improved, water resistance is reduced, and production of condensate water is minimized.

According to the air conditioner having an integrated heat exchanger and the air conditioning system using an integrated heat exchanger that are configured in the structures described above, since heating air and cooling air are generated through an integrated heat exchanger that enables heat exchange between cooling water and conditioning-air, cooling/heating efficiency is secured.

Further, since the temperature of the cooling water circulating in the integrated heat exchanger is adjusted, there is no temperature adjustment door for adjusting the temperature of conditioning-air, so the number of parts is reduced.

Further, since an integrated heat exchanger is applied, components are optimally arranged, so the entire package is reduced in size.

Although the present disclosure was provided above in relation to specific embodiments shown in the drawings, it is apparent to those having ordinary skill in the art that the present disclosure may be changed and modified in various ways without departing from the scope of the present disclosure.

What is claimed is:

1. An air conditioner having an integrated heat exchanger, the air conditioner comprising:
   an indoor heat exchanger disposed in an air conditioning housing and configured to generate heating air or cooling air by selectively passing first cooling water for heating and second cooling water for cooling;
   a heater spaced apart from the indoor heat exchanger in the air conditioning housing and configured to selectively discharge heat, wherein a bleed path is formed around the heater; and
   a door unit configured to adjust opening and closing of the bleed path and installed in the air conditioning housing.

2. The air conditioner of claim 1, wherein the indoor heat exchanger and the heater each include an upper portion and a lower portion, and the upper portions of the indoor heat exchanger and the heater are arranged to be close to each other and the lower portions are arranged to be far from each other.

3. The air conditioner of claim 1, wherein the bleed path is formed over the heater and a bypass path is formed under the heater in the air conditioning housing.

4. The air conditioner of claim 1, wherein the bleed path passes air at a flow rate of 25% or less of the air that has passed through the heater.

5. The air conditioner of claim 1, wherein the air conditioning housing includes an air inlet and several air outlets, and the several air outlets includes a defrosting vent hole and at least one front vent hole; and
   wherein the door unit includes a first door configured to adjust opening and closing of the bleed path and a second door configured to adjust opening and closing of the at least one front vent hole.

6. The air conditioner of claim 5, wherein the air conditioning housing has a third door configured to adjust opening and closing of the defrosting vent hole.

7. The air conditioner of claim 5, wherein the first door and the second door are installed at the air conditioning housing and configured to rotate on rotation shafts, respectively, and have moving pins at ends, respectively; and
   wherein the door unit further includes a cam having a plurality of guide slits, in which the moving pins are inserted, and configured to change rotation positions of the first and second doors through the moving pins moving along the plurality of guide slits, respectively.

8. The air conditioner of claim 7, wherein the plurality of guide slits of the cam extends in a rotation direction while bending inward and outward and have different shapes, so that timing of opening or closing of the bleed path and the at least one front vent hole are differently set.

9. The air conditioner of claim 5, wherein the air conditioning housing includes at least one rear vent hole at a lower portion thereof and a rear door is installed at the at least one rear vent hole.

10. The air conditioner of claim 9, wherein the rear door includes:
- a fourth door configured to allow air that has passed through the heater to selectively flow to the at least one rear vent hole; and
- a fifth door configured to allow air that has passed through the indoor heat exchanger to selectively flow to the at least one rear vent hole through a bypass path under the heater without passing through the heater.

11. The air conditioner of claim 1, wherein the door unit includes an opening/closing door configured to operate up and down in the bleed path to adjust opening and closing of the bleed path and an actuator configured to control a position of the opening/closing door.

12. An air conditioning system having an integrated heat exchanger, the air conditioning system comprising:
- a refrigerant circuit in which a refrigerant circulates and that includes a compressor, a condenser, an expander, and an evaporator;
- a first cooling water circuit in which first cooling water circulates to exchange heat with the condenser of the refrigerant circuit for heating;
- a second cooling water circuit in which second cooling water circulates to exchange heat with the evaporator of the refrigerant circuit for cooling;
- a valve module to which the first cooling water circuit and the second cooling water circuit are connected and that changes a flow direction of the first cooling water and the second cooling water; and
- an indoor heat exchanger that is disposed in the air conditioning housing, to which the first cooling water circuit and the second cooling water circuit are connected, and that receives the first cooling water for heating or the second cooling water for cooling and generates heating air or cooling air,
- wherein, in the air conditioning housing, a heater spaced apart from the indoor heat exchanger and configured to selectively generate heat is disposed, a bleed path is formed around the heater, and a door unit configured to adjust opening and closing of the bleed path is disposed.

13. The air conditioning system of claim 12, wherein the indoor heat exchanger includes a first heat exchanging part connected with the first cooling water circuit and configured to discharge heat through the first cooling water for heating and a second heat exchanging part connected with the second cooling water circuit and configured to absorb heat through the second cooling water for cooling.

14. The air conditioning system of claim 12, wherein the first cooling water circuit includes a first water pump and the second cooling water circuit includes a second water pump.

15. The air conditioning system of claim 12, wherein the first cooling water in the first cooling water circuit and the second cooling water in the second cooling water circuit are selectively shared by a plurality of sharing valves.

* * * * *